United States Patent
Kattimani et al.

(10) Patent No.: US 11,977,879 B2
(45) Date of Patent: May 7, 2024

(54) METHODS AND SYSTEMS FOR REMOTE CONFIGURATION OF SOFTWARE APPLICATIONS

(71) Applicant: INTUIT INC., Mountain View, CA (US)

(72) Inventors: Muralidhar Kattimani, San Jose, CA (US); Waseem Akram Syed, San Jose, CA (US); Pinkesh Sethi, Bangalore (IN)

(73) Assignee: INTUIT INC., Mountain View, CA (US)

( * ) Notice: Subject to any disclaimer, the term of this patent is extended or adjusted under 35 U.S.C. 154(b) by 267 days.

(21) Appl. No.: 17/392,465

(22) Filed: Aug. 3, 2021

(65) Prior Publication Data
US 2023/0039601 A1 Feb. 9, 2023

(51) Int. Cl.
*G06F 8/71* (2018.01)
*H04L 67/00* (2022.01)

(52) U.S. Cl.
CPC ............... *G06F 8/71* (2013.01); *H04L 67/34* (2013.01)

(58) Field of Classification Search
CPC ................................... G06F 8/71; H04L 67/34
See application file for complete search history.

(56) References Cited

U.S. PATENT DOCUMENTS

| 8,386,465 | B2* | 2/2013 | Ansari | H04L 47/80 707/713 |
| 2005/0235050 | A1* | 10/2005 | Baker | G06F 9/44505 709/219 |
| 2016/0132299 | A1* | 5/2016 | Harrison | G06F 9/44505 717/107 |
| 2019/0243665 | A1* | 8/2019 | Bolik | G06F 8/60 |
| 2020/0322422 | A1* | 10/2020 | Clift | G06F 9/452 |
| 2023/0039601 | A1* | 2/2023 | Kattimani | G06F 8/71 |

OTHER PUBLICATIONS

Wikipedia, Event (computing) dated Aug. 9, 2020, https://en.wikipedia.org/w/index.php?title=Event_(computing)&oldid=602539019, 5 pages.
European Application No. 22181053.4, Communication re Partial Search Report dated Dec. 1, 2022, 14 pages.

* cited by examiner

*Primary Examiner* — Lewis A Bullock, Jr.
*Assistant Examiner* — Theodore E Hebert
(74) *Attorney, Agent, or Firm* — Patterson + Sheridan, LLP

(57) ABSTRACT

Certain aspects of the present disclosure provide techniques for configuring a software application through a remote configuration service. An example method generally includes receiving, from a remote configuration service, a declarative construct. Generally, the declarative construct includes a definition of a workflow in an application to be executed within a player application deployed on a client device. Information associated with the definition of the workflow is extracted by parsing the declarative construct according to a schema defining a format of the declarative construct. The workflow is executed in the player application based on the extracted information defining functionality of the workflow.

16 Claims, 6 Drawing Sheets

```
Screen1
UI View 1
    SubView 1.1
        TextBox FName
        TextBox LName
        TextBox Address
        TextBox City
        TextBox State
        TextBox PostalCode
    SubView 1.2
        Button Submit; Action: goto Screen2

Screen2
UI View 2
    SubView 2.1
        ...
    SubView 2.2
        ...

Navigation:
condition1: Screen1 to Screen1
                back: navigate back path
                transition: clear text boxes condition2: Screen1 to Screen2
                back: navigate back path
                transition: reload content into text
                            boxes
```

FIG. 2

METHODS AND SYSTEMS FOR REMOTE CONFIGURATION OF SOFTWARE APPLICATIONS

INTRODUCTION

Aspects of the present disclosure relate to configuration of software applications, and more specifically to configuring the functionality of software applications via a remote configuration service.

BACKGROUND

Software applications can be consumed on a variety of devices, including desktop computers, laptops, tablets, smartphones, and the like. These applications may be native applications (e.g., applications for which an executable file is built specifically for that platform), web components hosted in a native application, or web applications in which data provided by a user is processed remotely. In many cases, building applications targeting different platforms entails the use of platform-specific code monoliths which include code for generating a user interface and application logic tightly bound to the application logic. In some cases, applications targeting a common platform do not work on every device implementing the common platform, resulting in developers having to write application logic that accommodates different devices on the common platform.

Generally, during the software development lifecycle, software applications, regardless of whether applications are deployed as native applications or cross-platform (e.g., web) applications, may be periodically updated. These updates generally entail recompiling and redeploying the software application to client devices on which these application have previously been installed. For web applications, redeployment may be a straightforward process, as the application updates may be implemented and provided to a user when the user next connects to a server on which the web application is hosted. However, for native applications executing on a client device, updating the software application generally entails installing a new version of the application on the client device. For applications that are deployed through an application store or other repository, however, updates may not be deployed to users of these applications immediately due to delays between submission of an updated version of the application to the application store or repository.

Thus, techniques are needed for efficiently deploying functional and user interface updates to software applications.

BRIEF SUMMARY

Certain embodiments provide a computer-implemented method for configuring a software application through a remote configuration service. An example method generally includes receiving, from a remote configuration service, a declarative construct. Generally, the declarative construct includes a definition of a workflow in an application to be executed within a player application deployed on a client device. Information associated with the definition of the workflow is extracted by parsing the declarative construct according to a schema defining a format of the declarative construct. The workflow is executed in the player application based on the extracted information defining functionality of the workflow.

Still further embodiments provide a computer-implemented method for validating and deploying declarative constructs used in configuring a software application through a remote configuration service. An example method generally includes receiving a declarative construct. The declarative construct generally includes a definition of a workflow in an application to be executed within a player application deployed on a client device. The declarative construct is validated against rules defining a valid construct for the workflow in the application. The validated declarative construct is deployed for distribution to a player application executing on a client device to execute the workflow.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2 illustrates an example of a declarative construct that may be used to configure the functionality of a software application executing on a client device.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
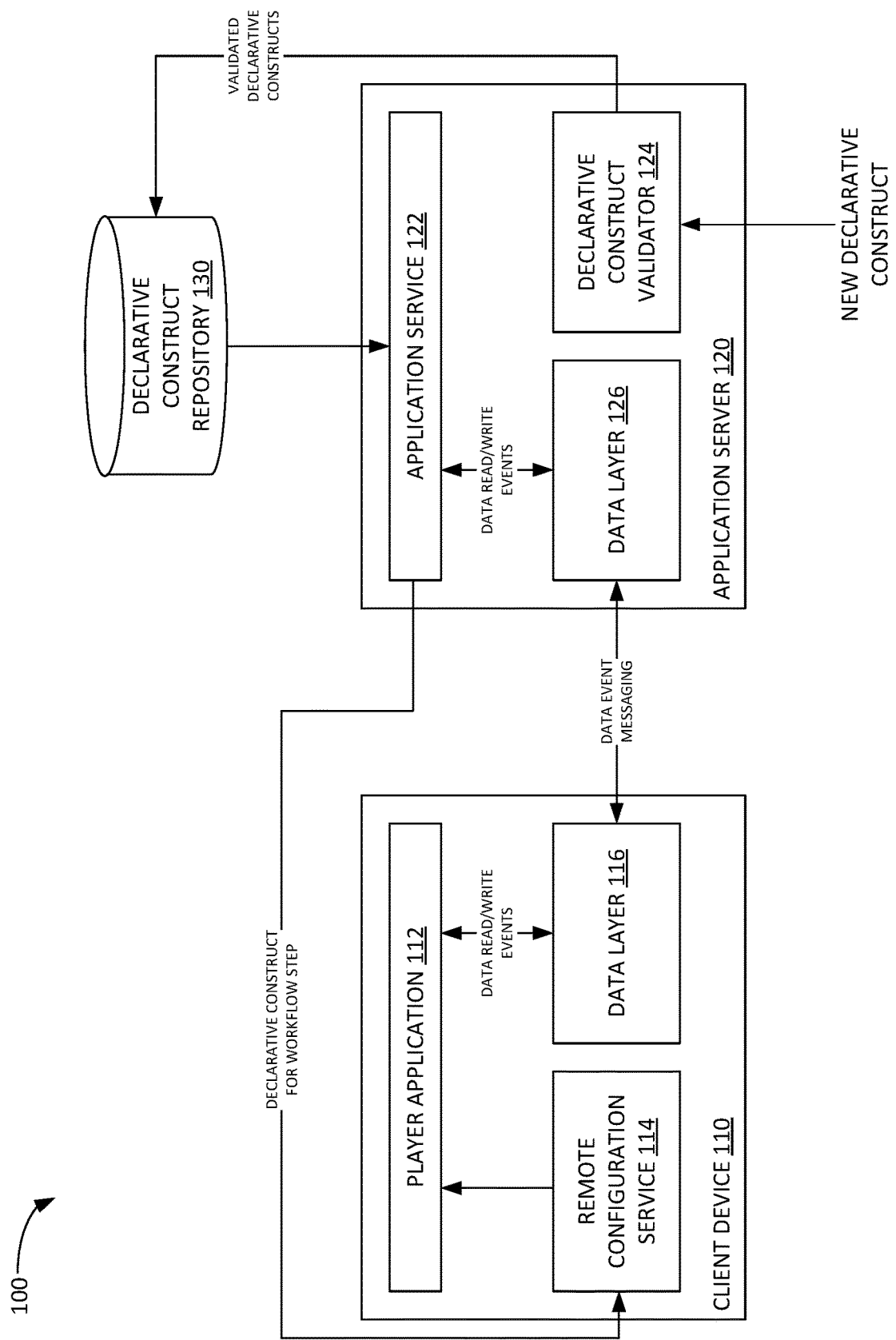
FIG. 1 depicts an example computing environment in which declarative constructs are validated and deployed to implement application functionality in a software application executing on a client device.

To reduce the amount of code to be maintained in a universe of related applications, software applications may be developed using a "write once, run anywhere" development paradigm. Typically, write once, run anywhere platforms include an interpreter used to execute program code compiled into a common language. While write once, run anywhere platforms allow for the generation and deployment of a single code artifact across different platforms, different code artifacts may still need to be generated for different variations of a workflow and/or different types of devices due to usability differences between the different types of devices (e.g., different user interfaces for desktop, web, and mobile applications, different capabilities of different types of devices, and the like). Because different software artifacts are generated for different variations of a workflow, updating the functionality of these different software artifacts generally entails updating many different software artifacts, debugging these software artifacts, and compiling and deploying these software artifacts to client devices.

In some cases, user interfaces and application logic may be tightly bound such that changing a user interface may also entail changes to application logic and such that changes in application logic may also entail changes to user interfaces. Because user interfaces are generally tightly bound to application logic, developers may need to spend development time to ensure that changes to application logic do not alter the user interface in an unexpected manner and that changes to the user interface do not alter or break the expected functionality of the underlying application logic. Thus, updating a software application may be a resource-intensive, time-consuming process.

Aspects of the present disclosure provide techniques for remotely configuring the functionality of software applications using declarative constructs that define the functionality of these software applications. As discussed in further detail herein, declarative constructs can include information about a user interface to display to a user of a software application, how the software application reacts to various events within the software application, logic for processing user input, and the like. Because these declarative constructs can be updated without needing to update software applications that use the declarative constructs to implement application functionality, aspects of the present disclosure may reduce the amount of computing resources used in maintaining software applications. For example, because the software applications deployed on client devices need not be updated in order to implement updated functionality (e.g., updates to a user interface or to application logic) identified in a declarative construct, processing resources, memory, network bandwidth, and other computing resources need not be used to test, compile, and deploy application binaries to computing devices that have installed a previous version of the software application.

Example Configuration of Applications Using Declarative Constructs and a Remote Configuration Service FIG. 1 illustrates an example computing environment 100 in which a player application executing on a client device is remotely configured to implement application functionality using declarative constructs provided by an application service at an application server. As illustrated, computing environment 100 includes a client device 110, an application server 120, and a declarative construct repository 130.

Client device 110 is generally representative of a computing device on which a user-facing client application can execute, such as a desktop computer, a laptop computer, a smartphone, a tablet, or other computing device. As illustrated, client device 110 includes a player application 112, a remote configuration service 114, and a data layer 116.

Player application 112 generally represents an application that allows a user to invoke functions defined by a declarative construct and/or invoke functions at an application service 122 executing on application server 120 to perform various operations provided by an application. A declarative construct, as used herein, generally refers to a parseable payload that defines various properties of a workflow executed in a player application 112 so that the player application need not be explicitly programmed a priori to execute any specific workflow. Generally, player application 112 may present a user interface to a user of client device 110 and may execute various functions when defined events occur within the application. In some aspects, player application 112 may be a shell application that implements functionality explicitly defined by a declarative construct. In some aspects, player application 112 may include functions for which various parameters are configured by a declarative construct.

To provide application functionality to a user of client device 110, player application 112 can request a declarative construct for a step in a workflow implemented in the player application from an application service 122 executing at application server 120. In requesting the declarative construct for the step in the workflow, player application 112 can identify the workflow, or the step in the workflow, in a request message placed on a communications link between client device 110 and application server 120. For example, player application 112 can place a request message on the communications link by requesting data through one or more messages placed on a data layer 116 through which data event messaging is exchanged between player application 112 and application service 122. In one aspect, the request message may be generated by invoking a data write event to identify the workflow, or the step in the workflow, that player application 112 is requesting from application service 122.

In some aspects, the request for the declarative construct generated and transmitted by player application 112 can include information identifying the user of the player application 112. This information may include, for example, a user name, a unique identifier associated with the user, or the like. Based on this information, application service 122 can identify a variant of the declarative construct to be provided to the player application 112. The identified variant of the declarative construct, for example, may be associated with a version or variant of the application for which the user of player application 112 has a subscription. In such a manner, the same player application 112 may be used to allow for the execution of many variations of a same application, which may further reduce the number of software artifacts to be maintained, updated, compiled, and deployed.

Remote configuration service 114 generally receives a declarative construct for the workflow or the step in the workflow implemented by the application and requested by player application 112 and uses the received declarative construct to configure the player application. Generally, the declarative construct may be received as parseable data (e.g., formatted as an eXtensible Markup Language (XML) payload, a JavaScript Object Notation (JSON) payload, or the like), which may be parsed according to rules defining a valid declarative construct for player application 112. To configure the player application, remote configuration service 114 can parse the declarative construct to identify the operating parameters, such as user interface layouts, events bound to user interface elements, parameters of various functions in the application, and the like, with which player application 112 is to be configured. It should be recognized that the declarative constructs provided to remote configuration service 114 may include user interface information alone, parameters defining how player application 112 is to operate alone, a combination of user interface information and parameters defining how player application 112 is to operate, and/or other information based on which player application 112 can operate.

To render a user interface in player application 112, remote configuration service 114 generally instructs player application 112 to render user interface components according to a layout identified in the declarative construct. The layout identified in the declarative construct may define, for example, relative locations and sizes of user interface components to be displayed to a user of player application 112. Additionally, other user interface information included in the declarative construct may define the appearance of these user interface components. In some aspects, the player application 112 may be configured with default appearance parameters (e.g., typeface, text color, button color, user interface component effects, etc.) to apply to the rendered user interface components if the declarative construct does not otherwise include information defining the appearance of the rendered user interface components. Otherwise, the remote configuration service 114 can instruct player application 112 to render the user interface components according to the appearance parameters provided in the declarative construct.

In some aspects, the declarative construct received from application service 122 includes information defining actions performed when a user interacts with the user interface components identified in the declarative construct. To configure player application 112, remote configuration service 114 can generate and attach event listeners to user interface elements having associated actions defined in the declarative construct. These event listeners generally monitor the associated user interface elements for specified types of user interaction (e.g., clicking or pressing a button, typing data into a text entry field) and, upon detecting an occurrence of the specified types of user interaction, performs the associated action. The associated action may include actions that do not cause a transition from one step in the workflow to another step in the workflow, such as re-formatting text in a text entry field or suggesting values to place in a text entry field, or may include actions that cause a transition from one step in the workflow to another step in the workflow.

When player application 112 detects interaction with a user interface element for which the associated event listener is configured to cause a transition from a current workflow to target workflow, player application 112 can execute one or more actions to request a declarative construct associated with the target workflow. For example, the one or more actions may include transmitting, to the application service, data entered into the user interface displayed by player application 112 and a request for a next step in a workflow as identified in the declarative construct in messaging between player application 112 and application service 122. In some aspects, the one or more actions may include writing the data entered into the user interface displayed by player application 112 and an identity of the next step in the workflow into one or more data items maintained by data layer 116 for transmission to and processing by data layer 126 at application server 120. In response to transmitting the data entered into the user interface displayed by player application 112 and the request for the next step in the workflow, application service 122 can provide the declarative construct for the requested step in the workflow to remote configuration service 114. Remote configuration service 114 can then use the received declarative construct for the requested step in the workflow to configure player application 112 to execute the requested step in the workflow.

In some aspects, remote configuration service 114 can generate event listeners that monitor for data events at data layer 116 and notify an associated user interface element of the occurrence of a data event at data layer 116 (e.g., via a subscription to data events in data layer 116). For example, as defined in a declarative construct, event listeners may be bound to text entry fields to allow for automatic updating of the text in these text entry fields when the underlying data changes in player application 112 or in application service 122 (e.g., as calculations are performed by one or more functions in player application 112 or application service 122). In another example, some events at data layer 116 may be linked to a submission of data to application service 122 for processing and a transition from one step in a workflow to another step in the workflow. In such a case, an event listener may listen for changes to a data point in the data layer 116 and, upon detecting that a change in the monitored data point has occurred, notify a user interface element associated with a workflow step transition that an event has occurred for which the button should be programmatically invoked.

As discussed, a declarative construct for a workflow or step in a workflow may also or alternatively include information identifying functions included in the workflow to be executed in player application 112. This information may include, for example, values of variables used in these functions, information specifying which specific variant of a function to execute (e.g., when a plurality of overloaded functions, or functions sharing a same name but different input and/or output arguments, exist in the application), criteria defining when each function of the identified functions in the declarative construct are to be executed, and the like. When an event occurs that triggers execution of a function identified in the declarative construct, the identified function can be executed according to the parameters and other criteria defined in the declarative construct for that function.

In some aspects, a plurality of player applications 112 may be deployed on a client device 110. For example, the plurality of player applications may include unique player applications for each of a plurality of different applications that can be remotely configured by application server 120. When remote configuration service 114 receives the declarative construct from application service 122, remote configuration service 114 can identify one of the plurality of player applications to execute the workflow. To execute the workflow, the remote configuration service 114 can dispatch the information extracted from the declarative construct to the identified one of the plurality of player applications.

Data layer 116 generally provides an interface through which application data can be exchanged between client device 110 and application server 120. Generally, data layer 116 can maintain data entries for which access and/or modification of the underlying data is permitted as a set of key-value pairs. To read data from data layer 116, player application 112 can generate a data read event including an identification of the key associated with the data to be read, and data layer 116 can return the value associated with that key. To write data to data layer 116, player application 112 can generate a data write event including an identification of the key associated with the data to be written and a value to be associated with the identified key. Generally, when key-value pairs are updated at data layer 116, corresponding data event messaging is exchanged with data layer 126 at application server 120 to ensure that the updated data is propagated to the application server 120 for application service 122 to use during execution.

Data layer 116 generally also monitors key-value pairs for updates from data layer 126 at application server 120. When a key-value pair is updated at application server 120, and when data event messaging including the updated key-value pair is received at data layer 116, data layer 116 can update its own copy of the key-value pair with the updated data received from application server 120. As discussed above, data layer 116 can also programmatically invoke various events in response to receiving the updated key-value pair to update data displayed in player application 112, execute functions in player application 112 defined by a declarative construct, or the like.

Application server 120 is generally representative of one or more physical or virtual computing devices on which an application may be executed. Application server 120, as illustrated, includes an application service 122, a declarative construct validator 124, and a data layer 126

Generally, application service 122 exposes one or more functions that may be invoked by messaging received from player application 112 to perform specified actions with respect to data received from player application 112 and/or stored in an application data repository. Generally, application service 122 can receive requests for declarative constructs from player application 112 at client device 110. In response, application service 122 can retrieve the appropriate declarative construct from declarative construct repository 130 and provide the retrieved declarative construct to remote configuration service 114 to configure player application 112, as discussed above.

In some aspects, application service 122 can perform one or more functions with respect to data shared between player application 112 and application service 122 via data layers 116 and 126, respectively. Like data layer 116 described above, data layer 126 generally maintains key-value pairs for a plurality of data points shared between player application 112 and application service 122. To update a key-value pair, application service 122 can invoke a data write event at data layer 126 including the key for which a corresponding value is to be updated and the value with which the key is to be associated. To read data, application service 122 can invoke a data read event at data layer 126 including the key associated with the data to be retrieved, and in response, application service 122 can receive the requested data from data layer 126.

Declarative construct validator 124 generally receives declarative constructs from an external source and validates the received declarative constructs against one or more rules defining a valid declarative construct for the player application 112. As discussed, a valid declarative construct may include information defining a user interface associated with a workflow and/or functions included in the workflow. In some aspects, a valid declarative construct may also include information identifying a specific player application, from a universe of player applications, that should be used at client device 110 to execute the declarative construct. If declarative construct validator 124 determines that the received declarative construct is valid for the player application 112 (e.g., that the received declarative construct does not include syntax errors, reference unknown functions, and the like), declarative construct validator can persist the validated declarative construct to declarative construct repository 130. Otherwise, declarative construct validator 124 can reject the received declarative construct. In rejecting the received declarative construct, declarative construct validator 124 can generate a message indicating the reasons why the received declarative construct is considered invalid and transmit the message to the computing device or other external source from which the declarative construct was received.

Example Declarative Construct for Configuring a Player Application

FIG. 2 illustrates an example of a declarative construct 200 that can be used to configure a user interface for a workflow executed in a player application, such as 112 of FIG. 1. While declarative construct 200, as illustrated, includes information defining a user interface for a player application, it should be recognized that declarative construct 200 can also or alternatively include information defining the properties of various functions to be implemented by and executed within the player application.

As illustrated, declarative construct 200 includes information defining a plurality of screens and a plurality of navigation conditions. Screen1, as illustrated, includes a user interface view, UI View 1, that in turn includes Sub-Views 1.1 and 1.2. SubView 1.1 includes a plurality of text boxes, and SubView 1.2 includes a submit button. When a user clicks on the button included in SubView 1.2, the application may transition from Screen1 to Screen2. Screen2, as illustrated, includes a user interface view, UI View 2, that in turn includes SubViews 2.1 and 2.2. Each of SubViews 2.1 and 2.2 may include information identifying a plurality of user interface elements to be displayed, positioning information for each of the user interface elements, actions associated with the user interface elements, and the like.

The navigation conditions illustrated in declarative construct 200 define actions that the player application is to perform when a specified navigation condition occurs. As illustrated, two navigation conditions are defined for the workflow defined by declarative construct 200. A first navigation condition corresponds to a situation where the application transitions from Screen1 back to Screen 1 (e.g., loops back to the same screen). In this case, the declarative construct 200 defines a back path (e.g., the actions that occur if a user attempts to navigate to a previous workflow or workflow step in the player application) that allows the user to navigate back to Screen1. Declarative construct 200 also defines a transition when the first navigation condition occurs. In this case, the defined transition causes the player application to clear any text boxes displayed to a user. A second navigation condition, meanwhile, corresponds to a situation where the application transitions from Screen1 to Screen2. In this case, the declarative construct 200 defines a back path that allows the user to navigate back to Screen 1. The transition defined for the second navigation condition, meanwhile, allows for previously-entered data (if any) to be re-loaded into the text boxes when the second navigation condition occurs.

Figure 3:
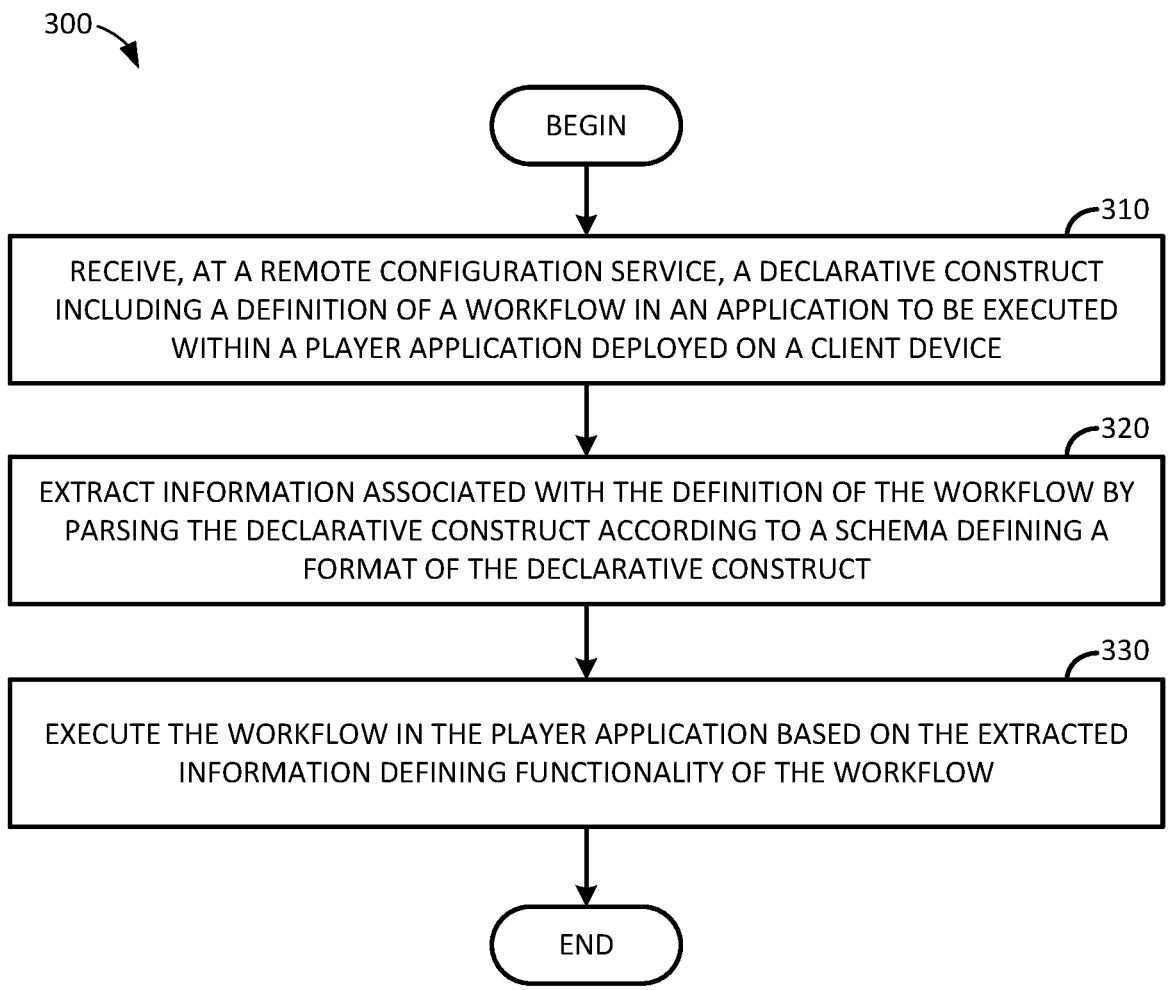
FIG. 3 illustrates example operations for configuring a software application based on a declarative construct defining a workflow in an application.

Example Computer-Implemented Method for Configuring an Application Using Declarative Constructs and a Remote Configuration Service FIG. 3 illustrates example operations 300 for configuring a player application based on a declarative construct defining a workflow in an application. In some cases, operations 300 may be performed by one or more of player application 112, remote configuration service 114, and/or data layer 116 illustrated in FIG. 1.

As illustrated, operations 300 begin at block 310, where a declarative construct is received at a remote configuration service (e.g., remote configuration service 114 of FIG. 1). The declarative construct generally includes a definition of a workflow in an application to be executed within a player application deployed on a client device (e.g., player application 112 of FIG. 1). As discussed, the declarative construct may be received as parseable data (e.g., an XML, or JSON payload) in which various parameters of the workflow to be executed in the player application are defined.

In some aspects, the declarative construct identifies a user interface associated with the workflow to be rendered by the player application. Actions may be associated with user interface components included in the user interface. For example, information defining these actions may include mappings between types of events (e.g., user interface selection or focus events, data entry events, etc.) and actions to perform when these events occur (e.g., what functions are triggered when an event occurs).

In some aspects, the declarative construct identifies functions included in the workflow for execution in the player application. For example, the declarative construct may include information identifying parameters for each of a plurality of functions. These parameters, which may include values of global variables, information identifying a specific variation of an overloaded function to use, and other information defining the functionality of functions in the workflow, can be used to configure the player application to perform various tasks according to the declarative construct such that the player application need not be configured a priori to perform these tasks.

In some aspects, the declarative construct may be associated with a version of the application for which the user has an active subscription. In such a case, each version of the application may expose different functionality and may thus be configured differently. By configuring the player application using a declarative construct that is associated with the version of the application for which the user has an active subscription, a single player application can be used to deliver functionality for each version of the application for which a subscription is available. In such a case, information identifying a user of the application can be transmitted in a request for the declarative construct to the application service. The information carried in the received declarative construct generally is based on the information identifying the user of the application such that the declarative construct includes user interface components and/or functional configurations for features associated with the version of the application for which the user has a subscription. The declarative construct may generally exclude user interface components and/or functional configurations for features associated with other versions of the application (i.e., versions of the application that include additional or alternative features relative to the version of the application for which the user has a subscription).

At block 320, information associated with the definition of the workflow is extracted from the declarative construct. To extract the information associated with the definition of the workflow, the declarative construct is generally parsed according to a schema defining a format of the declarative construct. The schema defining the format of the declarative construct may be defined a priori or provided to the player application during configuration of the player application (e.g., when the player application is initialized).

In some aspects, the player application may be selected from a universe of player applications for use in executing the workflow. For example, each player application may be associated with a particular application service (e.g., a first player application may be associated with an application service that exposes tax preparation functionality; a second player application may be associated with an application service that exposes invoice generation functionality; a third player application may be associated with an application service that exposes bookkeeping functionality; and so on). Information extracted from the declarative construct can be used to identify the player application to be used in executing the workflow from the universe of player applications so that the information extracted from the declarative construct is routed to the appropriate player application.

At block 330, the workflow is executed in the player application based on the extracted information defining the functionality of the workflow.

In cases where the declarative construct includes information defining a user interface associated with the workflow, executing the workflow in the player application generally includes rendering the user interface according to the information in the declarative construct. This information may include, for example, information identify the type and location of each user interface element to be rendered in the player application. The information may further include associations between user interface components and event listeners configured to listen for events within the player application and trigger execution of a function when an event occurs. Generally, these event listeners may be configured to listen for user interaction with user interface elements, such as typing information into a text box, clicking on a button, selecting one of a plurality of options in a drop-down box or set of option buttons, or the like.

These event listeners may also or alternatively be configured to listen for data events in key-value pairs maintained at a data layer configured to publish data to a remote service and subscribe to communications from the remote service. When an event occurs (e.g., an event listener detects user interaction with an associated user interface component, detects a change in a key-value pair in the data layer, etc.), the action associated with the event is executed. In some aspects, executing the action associated with the event may include updating one or more key-value pairs in the data layer, submitting data to an application service for processing, and the like. In response, the player application can receive a second declarative construct including a definition of a second workflow in the application and can execute the second workflow in the player application based on information included in the second declarative construct.

In some aspects, as discussed above, the declarative construct may include information identifying functions included in the workflow for execution in the player application. To execute the workflow in the player application, the player application can execute the identified functions according to criteria defining when each function is to be executed. For example, a function identified in the declarative construct may be associated with a particular event for which an event handler is generated in the player application; when this particular event occurs, the function may be executed according to the parameters included in the declarative construct.

Figure 4:
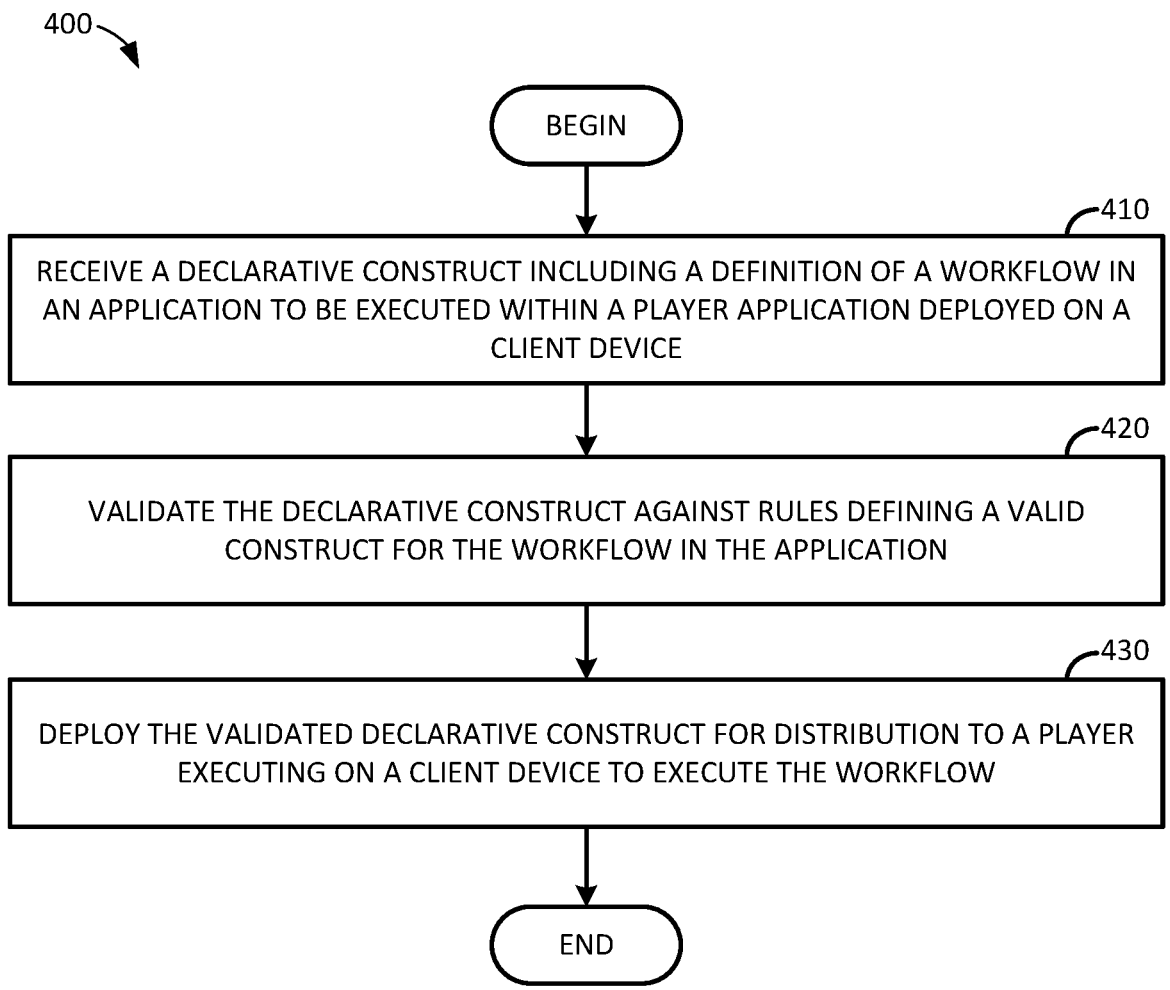
FIG. 4 illustrates example operations for validating and deploying a declarative construct defining a workflow in an application for deployment to a client device.

FIG. 4 illustrates example operations 400 for validating and deploying a declarative construct defining a workflow in an application for deployment to a client device. Operations 400 may be performed, for example, by one or more of application service 122, declarative construct validator 124, and/or data layer 126 illustrated in FIG. 1.

As illustrated, operations 400 begin at block 410, where a declarative construct is received. The declarative construction generally includes a definition of a workflow in an application to be executed within a player application deployed on a client device. As discussed above, the declarative construct may include information identifying or otherwise defining a user interface associated with the workflow for rendering in the player application and/or functions included in the workflow for execution in the player application. The declarative construct may also include information identifying when the declarative construct is to be provided to a player application (e.g., a version of an application for which the declarative construct defines a workflow) and information identifying a specific player application to use in executing the workflow.

At block 420, the declarative construct is validated against rules defining a valid construct for the workflow in the application. The rules defining a valid construct for the workflow in the application may include a schema shared between the player application and the application service that defines the format of the declarative construct, mandatory and optional information in the declarative construct, and the like. If the declarative construct is validated against the schema, the declarative construct may be deemed ready for deployment to a player application. Otherwise, the declarative construct may be rejected, and an error message may be generated and transmitted to the system from which the declarative construct was received. The error message generally includes information identifying errors in the declarative construct relative to the rules defining a valid construct for the workflow.

At block 430, the validated declarative construct is deployed for distribution to a player application executing on a client device. Generally, to deploy the validated declarative construct, the validated declarative construct may be persisted to a declarative construct repository, and an application service can retrieve the validated declarative construct and transmit the validated declarative construct to a client device for use in configuring the player application on the client device. In some aspects, the validated declarative construct may be versioned such that previous versions of the declarative construct may also be maintained in a declarative construct repository for use in reverting to functionality in an earlier version of an application (e.g., if the validated declarative construct causes the player application to fail).

After the validated declarative construct is deployed (e.g., persisted to the declarative construct repository), the validated declarative construct may be used to configure a player application. To do so, a request to execute the workflow in the player application may be received from the player application. In response to receiving this request, the validated declarative construct may be transmitted to the player application, and the player application can parse the declarative construct and execute the workflow based on parsing the declarative construct, as discussed above.

Figure 5:
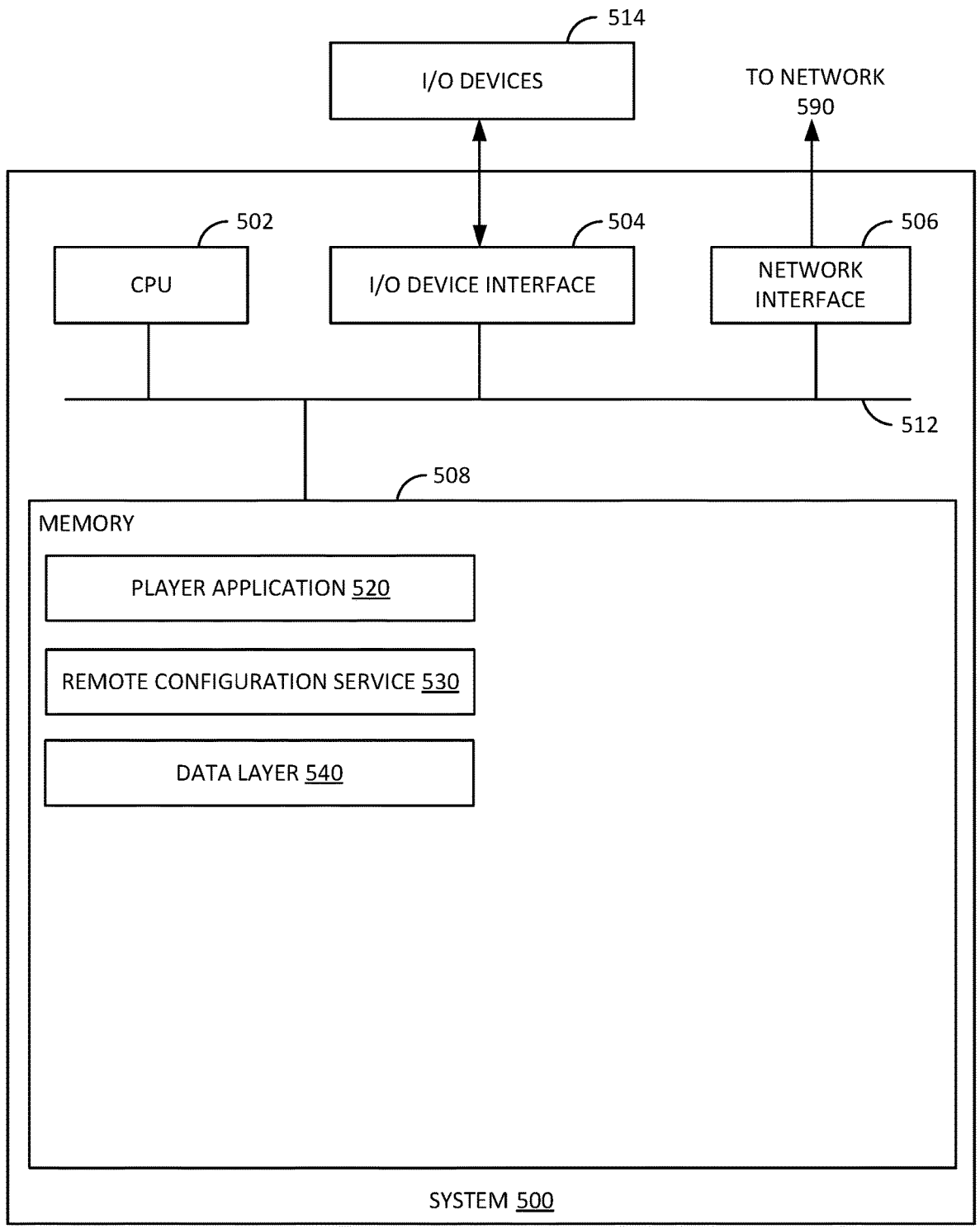
FIG. 5 illustrates an example system on which embodiments of the present disclosure can be performed.

Example Systems for Configuring Applications Using Declarative Constructs and a Remote Configuration Service FIG. 5 illustrates an example system 500 in which a client application communicates with an application service via a persistent connection and a persistent communication service through which the persistent connection is maintained. System 500 may correspond to client device 110 illustrated in FIG. 1.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 through which system 500 is connected to network 590 (which may be a local network, an intranet, the internet, or any other group of computing devices communicatively connected to each other), a memory 508, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As shown, memory 508 includes a player application 520, remote configuration service 530, and data layer 540.

Player application 520 generally corresponds to player application 112 illustrated in FIG. 1. Player application 520 generally receives information parsed from a declarative construct by a remote configuration service (e.g., remote configuration service 530) to execute a workflow in an application. The information may include a user interface definition, parameters of functions to be executed in the player application 520, information identifying the player application, information based on an identity of the user of the player application 520, and the like. Generally, events that occur in player application 520 may trigger the execution of one or more functions identified in the declarative construct and may generate, for transmission to an application server, a request for a declarative construct associated with a subsequent step in the workflow.

Remote configuration service 530 generally corresponds to remote configuration service 114 illustrated in FIG. 1. Generally, remote configuration service 530 receives declarative constructs from an application server, parses these declarative constructs, and configures player application 520 based on the information included in these declarative constructs. In some aspects, remote configuration service 530 can identify which player application out of a universe of player applications to use in executing the workflow or workflow step associated with a received declarative construct and route the information parsed from the received declarative construct to the appropriate player application.

Data layer 540 generally corresponds to data layer 116 illustrated in FIG. 1. Generally, data layer 540 maintains a connection with a corresponding data layer at an application server in which key-value pairs used by player application 520 during execution are maintained. Data layer 540 receives data read requests from player application 520 including a key associated with the data to be retrieved, and in response, data layer 540 provides the associated data to player application 520. Data layer 540 also receives data write requests from player application 520 including a key and a new value to be associated with the key. When the key-value pair is updated, data layer 540 can generate a data event message to its counterpart at an application server to notify the application service executing on the application server that data within the application has been updated. Data layer 540 also monitors for data updates performed by the application service at the application server, and upon detecting that a key-value pair has changed, can trigger execution of one or more functions to respond to the change in the key-value pair.

Note that FIG. 5 is just one example of a system, and other systems including fewer, additional, or alternative components are possible consistent with this disclosure.

Figure 6:
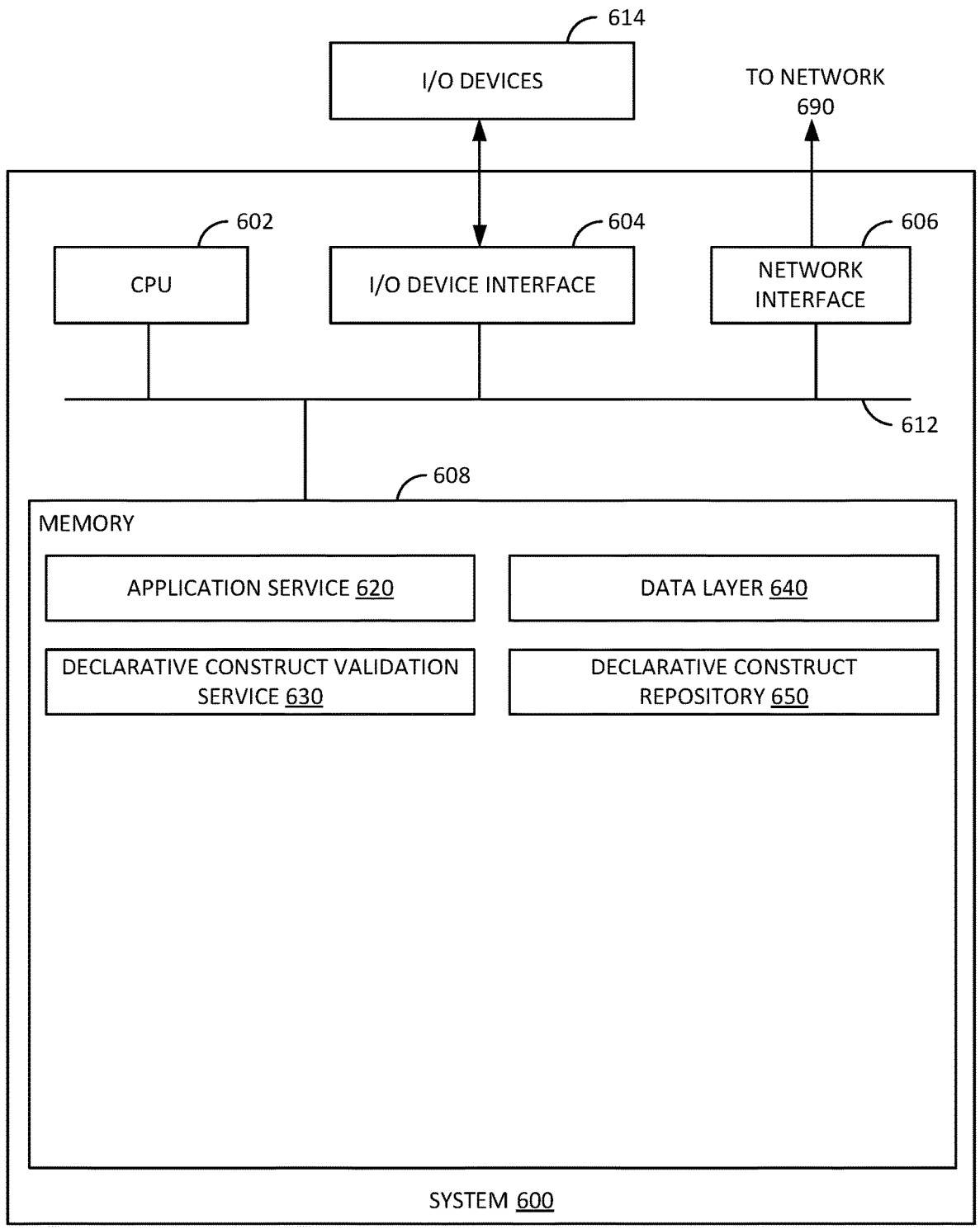
FIG. 6 illustrates another example system on which embodiments of the present disclosure can be performed.

FIG. 6 illustrates an example system 600 in which a client application communicates with an application service via a persistent connection and a persistent communication service through which the persistent connection is maintained. System 600 may correspond to application server 120 illustrated in FIG. 1.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 690 (which may be a local network, an intranet, the internet, or any other group of computing devices communicatively connected to each other), a memory 608, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, and memory 608.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes an application service 620, declarative construct validator 630, data layer 640, and declarative construct repository 650.

Application service 620 generally corresponds to application service 122 illustrated in FIG. 1. Application service 620 generally receives requests for declarative constructs associated with workflows or steps in a workflow from a player application executing on a client device and, in response to these requests, retrieves a validated declarative construct from declarative construct repository 650 and transmits the declarative construct to the client device for use in configuring the player application. In some aspects, application service 620 may perform various operations based on data received from the player application directly or received in key-value pair updates detected by data layer 640.

Declarative construct validator 630 generally corresponds to declarative construct validator 124 illustrated in FIG. 1. Generally, declarative construct validator 630 receives a declarative construct from an external source and attempts to validate the declarative construct against a schema defining a proper format for the declarative construct. If the declarative construct is validated, declarative construct validator 630 persists the declarative construct to declarative construct repository 650 (or a remote repository) for future use in configuring a player application at a client device. Otherwise, declarative construct validator 630 can reject the declarative construct and transmit a message to the source machine from which the declarative construct was received including information identifying why the declarative construct failed validation.

Data layer 640 generally corresponds to data layer 126 illustrated in FIG. 1. Generally, data layer 640 maintains a connection with a corresponding data layer at a client device in which key-value pairs used by application service 620 during execution are maintained. Data layer 640 receives data read requests from application service 620 including a key associated with the data to be retrieved, and in response, data layer 640 provides the associated data to application service 620. Data layer 640 also receives data write requests from application service 620 including a key and a new value to be associated with the key. When the key-value pair is updated, data layer 640 can generate a data event message to its counterpart at a client device to notify the player application executing on the client device that data within the application has been updated. Data layer 640 also monitors for data updates performed by the player application at the client device, and upon detecting that a key-value pair has changed, can trigger execution of one or more functions at application service 620 to respond to the change in the key-value pair.

Note that FIG. 6 is just one example of a system, and other systems including fewer, additional, or alternative components are possible consistent with this disclosure.

Example Clauses

Implementation examples are described in the following numbered clauses:

Clause 1: A method, comprising: receiving, from a remote configuration service, a declarative construct including a definition of a workflow in an application to be executed within a player application deployed on a client device; extracting information associated with the definition of the workflow by parsing the declarative construct according to a schema defining a format of the declarative construct; and executing the workflow in the player application based on the extracted information defining functionality of the workflow.

Clause 2: The method of Clause 1, wherein the declarative construct identifies a user interface associated with the workflow to be rendered by the player application and actions associated with user interface components included in the user interface associated with the workflow.

Clause 3: The method of Clause 2, wherein for each respective user interface component of the user interface components included in the user interface, the declarative construct further specifies a respective action in the application triggered by user interaction with the respective user interface component.

Clause 4: The method of Clause 3, wherein executing the workflow in the player application comprises attaching a respective event listener to the respective user interface component, the respective event listener being configured to execute the respective action in response to detecting user interaction with the respective user interface component.

Clause 5: The method of Clause 4, further comprising: detecting, through the respective event listener, user interaction with the respective user interface component; executing the respective action based on detecting user interaction with the respective user interface component; receiving a second declarative construct including a definition of a second workflow in the application; and executing the second workflow in the player application based on information included in the second declarative construct.

Clause 6: The method of any one of Clauses 1 through 5, wherein the declarative construct identifies functions included in the workflow for execution in the player application.

Clause 7: The method of Clause 6, wherein executing the workflow in the player application comprises executing the functions identified in the declarative construct according to criteria defining when each function of the functions are to be executed.

Clause 8: The method of any one of Clauses 1 through 7, further comprising: transmitting a request for the declarative construct, the request including information identifying a user of the application, wherein information carried in the declarative construct is based on the information identifying the user of the application.

Clause 9: The method of any one of Clauses 1 through 8, wherein executing the workflow in the player application based on the extracted information defining functionality of the workflow comprises: communicating with a remote service through a data layer configured to publish data to the remote service and subscribe to communications from the remote service.

Clause 10: The method of Clause 9, wherein executing the workflow in the player application comprises: subscribing a user interface element in the player application to data events in the data layer; and upon determining that data in the data layer has changed, notifying the user interface element that the data in the data layer has changed.

Clause 11: The method of any one of Clauses 9 or 10, wherein the data layer is configured to publish data to the remote service and subscribe to communications from the remote service based on a respective unique key associated with each unique respective data item for which the data layer allows for data access and modification.

Clause 12: The method of any one of Clauses 1 through 11, further comprising identifying, from the extracted information, a player application within a universe of different player applications to execute the workflow, wherein executing the workflow in the player application comprises dispatching the extracted information to the identified player application.

Clause 13: A method, comprising: receiving a declarative construct including a definition of a workflow in an application to be executed within a player application deployed on a client device; validating the declarative construct against rules defining a valid construct for the workflow in the application; and deploying the validated declarative construct for distribution to a player application executing on a client device to execute the workflow.

Clause 14: The method of Clause 13, wherein the declarative construct identifies a user interface associated with the workflow to be rendered by the player application and actions associated with user interface components included in the user interface associated with the workflow.

Clause 15: The method of any one of Clauses 13 or 14, wherein the declarative construct identifies functions included in the workflow for execution in the player application.

Clause 16: The method of any one of Clauses 13 through 15, further comprising: receiving, from the player application, a request to execute the workflow in the player application; and transmitting, to the player application, the validated declarative construct in response to the request.

Clause 17: The method of Clause 16, further comprising communicating with the player application through a data layer configured to publish data to the player application and subscribe to communications from the player application.

Clause 18: The method of Clause 17, wherein the data layer is configured to publish data to the player application and subscribe to communications from the player application based on a respective unique key associated with each unique respective data item for which the data layer allows for data access and modification.

Clause 19: The method of any one of Clauses 16 through 18, wherein the validated declarative construct includes information identifying a specific player application with a universe of different player applications to execute the workflow.

Clause 20: A system, comprising: a memory having executable instructions stored thereon; and a processor configured to execute the executable instructions to perform the methods of any one of Clauses 1 through 19.

Clause 21: A system, comprising: means for performing the methods of any one of Clauses 1 through 19.

Clause 22: A computer-readable medium having instructions stored thereon which, when executed by a processor, performs the methods of any one of Clauses 1 through 19.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
receiving, from a remote configuration service, a declarative construct including a definition of a workflow in an application to be executed within a player application deployed on a client device, wherein:
the declarative construct identifies a user interface associated with the workflow to be rendered by the player application and actions associated with user interface components included in the user interface associated with the workflow, and
for each respective user interface component of the user interface components included in the user interface, the declarative construct further specifies a respective action in the application triggered by user interaction with the respective user interface component;
extracting information associated with the definition of the workflow by parsing the declarative construct according to a schema defining a format of the declarative construct;
executing the workflow in the player application based on the extracted information defining functionality of the workflow, wherein executing the workflow comprises attaching a respective event listener to the respective user interface component, the respective event listener being configured to execute the respective action in response to detecting user interaction with the respective user interface component;

detecting, through the respective event listener, user interaction with the respective user interface component;

executing the respective action based on detecting user interaction with the respective user interface component; and based on executing the respective action:
receiving a second declarative construct including a definition of a second workflow in the application; and executing the second workflow in the player application based on information included in the second declarative construct.

2. The method of claim 1, wherein the declarative construct identifies functions included in the workflow for execution in the player application.

3. The method of claim 2, wherein executing the workflow in the player application comprises executing the functions identified in the declarative construct according to criteria defining when each function of the functions are to be executed.

4. The method of claim 1, further comprising:
transmitting a request for the declarative construct, the request including information identifying a user of the application,
wherein information carried in the declarative construct is based on the information identifying the user of the application.

5. The method of claim 1, wherein executing the workflow in the player application based on the extracted information defining functionality of the workflow comprises: communicating with a remote service through a data layer configured to publish data to the remote service and subscribe to communications from the remote service.

6. The method of claim 5, wherein executing the workflow in the player application comprises:
subscribing a user interface element in the player application to data events in the data layer; and
upon determining that data in the data layer has changed, notifying the user interface element that the data in the data layer has changed.

7. The method of claim 5, wherein the data layer is configured to publish data to the remote service and subscribe to communications from the remote service based on a respective unique key associated with each unique respective data item for which the data layer allows for data access and modification.

8. The method of claim 1, further comprising identifying, from the extracted information, a player application within a universe of different player applications to execute the workflow, wherein executing the workflow in the player application comprises dispatching the extracted information to the identified player application.

9. A system, comprising:
a memory having executable instructions stored thereon; and
a processor configured to execute the executable instructions to cause the system to:
receive, from a remote configuration service, a declarative construct including a definition of a workflow in an application to be executed within a player application deployed on a client device, wherein:
the declarative construct identifies a user interface associated with the workflow to be rendered by the player application and actions associated with user interface components included in the user interface associated with the workflow, and for each respective user interface component of the user interface components included in the user interface, the declarative construct further specifies a respective action in the application triggered by user interaction with the respective user interface component;

extract information associated with the definition of the workflow by parsing the declarative construct according to a schema defining a format of the declarative construct; and execute the workflow in the player application based on the extracted information defining functionality of the workflow, wherein executing the workflow comprises attaching a respective event listener to the respective user interface component, the respective event listener being configured to execute the respective action in response to detecting user interaction with the respective user interface component;

detect, through the respective event listener, user interaction with the respective user interface component;

execute the respective action based on detecting user interaction with the respective user interface component; and based on executing the respective action:
receive a second declarative construct including a definition of a second workflow in the application; and execute the second workflow in the player application based on information.

10. The system of claim 9, wherein the declarative construct identifies functions included in the workflow for execution in the player application.

11. The system of claim 10, wherein to execute the workflow in the player application, the processor is configured to cause the system to execute the functions identified in the declarative construct according to criteria defining when each function of the functions are to be executed.

12. The system of claim 9, wherein the processor is further configured to cause the system to:
transmit a request for the declarative construct, the request including information identifying a user of the application,
wherein information carried in the declarative construct is based on the information identifying the user of the application.

13. The system of claim 9, wherein to execute the workflow in the player application based on the extracted information defining functionality of the workflow, the processor is configured to cause the system to: communicate with a remote service through a data layer configured to publish data to the remote service and subscribe to communications from the remote service.

14. The system of claim 13, wherein to execute the workflow in the player application, the processor is configured to cause the system to:
subscribe a user interface element in the player application to data events in the data layer; and
upon determining that data in the data layer has changed, notify the user interface element that the data in the data layer has changed.

15. The system of claim 13, wherein the data layer is configured to publish data to the remote service and subscribe to communications from the remote service based on a respective unique key associated with each unique respective data item for which the data layer allows for data access and modification.

16. The system of claim 9, wherein the processor is further configured to cause the system to identify, from the extracted information, a player application within a universe of different player applications to execute the workflow, wherein to execute the workflow in the player application, the processor is configured to cause the system to dispatch the extracted information to the identified player application.

* * * * *